(12) United States Patent
Qiu et al.

(10) Patent No.: US 10,528,492 B2
(45) Date of Patent: Jan. 7, 2020

(54) CIRCUIT, METHOD AND APPARATUS FOR USB INTERFACE SHARING

(71) Applicant: ZTE Corporation, Shenzhen (CN)

(72) Inventors: Tengyuan Qiu, Shenzhen (CN); Guodong Song, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 47 days.

(21) Appl. No.: 15/568,603

(22) PCT Filed: Jul. 17, 2015

(86) PCT No.: PCT/CN2015/084376
§ 371 (c)(1),
(2) Date: Oct. 23, 2017

(87) PCT Pub. No.: WO2016/169140
PCT Pub. Date: Oct. 27, 2016

(65) Prior Publication Data
US 2018/0121373 A1 May 3, 2018

(30) Foreign Application Priority Data
Apr. 23, 2015 (CN) .......................... 2015 1 0194930

(51) Int. Cl.
*G06F 13/40* (2006.01)
*G06F 13/10* (2006.01)
(Continued)

(52) U.S. Cl.
CPC .............. *G06F 13/102* (2013.01); *G06F 1/32* (2013.01); *G06F 13/20* (2013.01); *G06F 13/38* (2013.01);
(Continued)

(58) Field of Classification Search
None
See application file for complete search history.

(56) References Cited

U.S. PATENT DOCUMENTS 7,480,758 B2 * 1/2009 Lin ........................ G06F 13/426
710/104
7,840,819 B2 * 11/2010 Chang ...................... G06F 1/26
713/300
(Continued)

FOREIGN PATENT DOCUMENTS

CN 101369259 A 2/2009
CN 102750248 A 10/2012
(Continued)

OTHER PUBLICATIONS

International Search Report for corresponding application PCT/CN2015/084376 filed on Jul. 17, 2015; dated Sep. 24, 2015.
(Continued)

*Primary Examiner* — Elias Mamo
(74) *Attorney, Agent, or Firm* — Cantor Colburn LLP

(57) ABSTRACT

A circuit for USB interface sharing includes a host device module, a slave device module, a switch module and a Universal Serial Bus (USB) interface. A detection end of the host device module is connected to a signal detection end of the USB interface. A first control output end of the host device module is connected to a first control input end of the switch module. A data end of the host device module is connected to a first data end of the switch module. A data end of the slave device module is connected to a second data end of the switch module. A third data end of the switch module is connected to a data end of the USB interface.

10 Claims, 3 Drawing Sheets

(51) Int. Cl.
*G06F 13/38* (2006.01)
*G06F 1/32* (2019.01)
*G06F 13/20* (2006.01)

(52) U.S. Cl.
CPC ...... *G06F 13/4022* (2013.01); *G06F 13/4068* (2013.01); *G06F 13/4072* (2013.01); *G06F 2213/0042* (2013.01)

(56) References Cited

U.S. PATENT DOCUMENTS

| | | | |
|---|---|---|---|
| 2003/0172223 A1 | 9/2003 | Ying | |
| 2004/0189808 A1* | 9/2004 | Tanaka | G06K 15/00 348/207.1 |
| 2006/0123175 A1 | 6/2006 | Yu | |
| 2010/0133908 A1* | 6/2010 | Weng | G06F 1/266 307/48 |
| 2011/0029703 A1* | 2/2011 | Huo | G06F 13/4068 710/110 |
| 2014/0361733 A1* | 12/2014 | Zhu | H02J 7/0052 320/107 |

FOREIGN PATENT DOCUMENTS

| | | |
|---|---|---|
| CN | 103019981 A | 4/2013 |
| EP | 2650752 A2 | 10/2013 |

OTHER PUBLICATIONS

European Search Report for corresponding application EP15889629; dated Mar. 21, 2018.

* cited by examiner

CIRCUIT, METHOD AND APPARATUS FOR USB INTERFACE SHARING

TECHNICAL FIELD

The present disclosure relates to the field of terminal technologies, and in particular to a circuit, a method and an apparatus for sharing a Universal Serial Bus (USB) interface.

BACKGROUND

USB devices may be divided into host devices and slave devices. If a device has a USB host device function, and when the device is connected to a USB slave device, the device may acquire data from the connected USB slave device and realize data transmission. At present, various terminals may have USB host device functions, for example, computer, home gateway, set top box and so on. A USB interface arranged on the terminal may generally serve as a host device interface, through which a slave device such as USB flash disk may be connected to the terminal to realize data communication.

Besides a host device function, a terminal may further include a slave device module (may also be referred to as slave device function module). Other peripheral USB host devices may be connected to a USB interface of the slave device function module of the terminal, so as to realize USB interface debugging or acquire relevant information of the slave device module. To realize the host device function and slave device function of the terminal simultaneously, besides arranging a common USB interface on the terminal to serve as a host device interface, a USB connector may be separately reserved inside a board to serve as a slave device interface. However, the USB connector may be relatively large, which is not beneficial for terminal miniaturization. Moreover, since the USB connector may be arranged inside the board, it may be needed to disassemble the structure of the terminal before the USB connector can be used, which brings inconvenience to utilization of the USB connector.

SUMMARY

Some exemplary embodiments of the present disclosure provide a circuit, a method and an apparatus for USB interface sharing, which may realize the data transmission of host device functions and slave device functions of a terminal using one standard USB interface.

An exemplary embodiment of the present disclosure provides a circuit for USB interface sharing. The circuit for USB interface sharing may include: a host device module, a slave device module, a switch module and a USB interface. A detection end of the host device module may be connected to a signal detection end of the USB interface. A first control output end of the host device module may be connected to a first control input end of the switch module. A data end of the host device module may be connected to a first data end of the switch module. A data end of the slave device module may be connected to a second data end of the switch module. A third data end of the switch module may be connected to a data end of the USB interface.

In an exemplary embodiment, the switch module may include a USB signal switch. A control input end of the USB signal switch may serve as the first control input end of the switch module and may be connected to the first control output end of the host device module. A first end of the USB signal switch may serve as the first data end of the switch module and may be connected to the data end of the host device module. A second end of the USB signal switch may serve as the second data end of the switch module and may be connected to the data end of the slave device module. A third end of the USB signal switch may serve as the third data end of the switch module and may be connected to the data end of the USB interface.

In an exemplary embodiment, a second control output end of the host device module may be connected to a second control input end of the switch module. A power input end of the switch module may be connected to a power supply of a terminal. A power output end of the switch module may be connected to a power input end of the USB interface.

In an exemplary embodiment, the switch module may further include a current limitation switch and a diode in parallel connection with the current limitation switch. A control input end of the current limitation switch may serve as the second control input end of the switch module and may be connected to the second control output end of the host device module. A power input end of the current limitation switch may serve as the power input end of the switch module and may be connected to the power supply of the terminal. A power output end of the current limitation switch may serve as the power output end of the switch module and may be connected to the power input end of the USB interface. An anode of the diode may be connected to the power input end of the current limitation switch and a cathode of the diode may be connected to the power output end of the current limitation switch.

Another embodiment of the present disclosure provides a method for USB interface sharing. The method may include the following acts.

A USB signal may be detected, and a type of a peripheral device currently accessing the USB interface may be judged.

When the type of the peripheral device is USB host device, the USB signal switch of the switch module may be switched to the slave device module, and a path between the slave device module and the USB interface may be switched on.

When the type of the peripheral device is USB slave device, the USB signal switch of the switch module may be switched to the host device module, and a path between the host device module and the USB interface may be switched on.

In an exemplary embodiment, when the type of the peripheral device is USB host device, after the USB signal switch of the switch module is switched to the slave device module and the path between the slave device module and the USB interface is switched on, the method may further include the following act.

A current limitation switch of the switch module may be opened, such that a power supply of a terminal may supply power to the USB interface via a diode of the switch module.

In an exemplary embodiment, when the type of the peripheral device is USB slave device, after the USB signal switch of the switch module is switched to the host device module and the path between the host device module and the USB interface is switched on, the method may further include the following act.

A current limitation switch of the switch module may be closed, such that a power supply of a terminal directly may supply power to the USB interface.

Still another embodiment of the present disclosure provides an apparatus for USB interface sharing. The apparatus may include a host device module and a switch module.

The host device module may detect a USB signal and judge a type of a peripheral device currently accessing the USB interface. When the type of the peripheral device is USB host device, the host device module may control the switch module to switch on a path between the slave device module and the USB interface. When the type of the peripheral device is USB slave device, the host device module may control the switch module to switch on a path between the host device module and the USB interface.

In an exemplary embodiment, the switch module may include a USB signal switch. When the type of the peripheral device is USB host device, the host device module may control the USB signal switch of the switch module to switch to the slave device module. When the type of the peripheral device is USB slave device, the host device module may control the USB signal switch of the switch module to switch to the host device module.

In an exemplary embodiment, the switch module may further include a current limitation switch and a diode. When the type of the peripheral device is USB slave device, the host device module may control the current limitation switch of the switch module to be closed, such that a power supply of a terminal directly may supply power to the USB interface. When the type of the peripheral device is USB host device, the host device module may control the current limitation switch of the switch module to be opened, such that the power supply of the terminal may supply power to the USB interface via the diode.

The solution in some embodiments of the present disclosure may enable the USB interface of the terminal to be shared simultaneously as a functional interface of a host device and a functional interface of a slave device, such that functions of the host device and functions of the slave device may be completed by one USB interface on the terminal, thereby providing convenience for data transmission between the terminal and the peripheral device. Moreover, it may not be needed to develop an interface inside a board separately, the internal board space may be saved and the miniaturization design of the terminal may be facilitated.

The implementation, function features and advantages of the present disclosure are described in detail in conjunction with exemplary embodiments by reference to the drawings.

DETAILED DESCRIPTION OF THE EMBODIMENTS

It should be understood that specific exemplary embodiments described below are merely to illustrate the present disclosure but to limit the present disclosure.

Figure 1A:
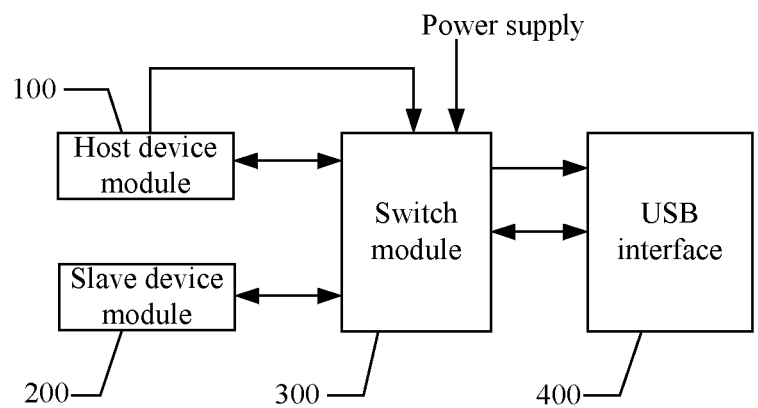
FIG. 1a is a structure diagram of an exemplary embodiment of a circuit for USB interface sharing of the disclosure.

FIG. 1a is a structure diagram of an exemplary embodiment of a circuit for USB interface sharing of the disclosure. As shown in FIG. 1a, the circuit for USB interface sharing mentioned in this exemplary embodiment may include a host device module 100, a slave device module 200, a switch module 300 and a USB interface 400. A detection end of the host device module 100 may be connected to a signal detection end of the USB interface 400. A first control output end of the host device module 100 may be connected to a first control input end of the switch module 300. A data end of the host device module 100 may be connected to a first data end of the switch module 300. A data end of the slave device module 200 may be connected to a second data end of the switch module 300. A third data end of the switch module 300 may be connected to a data end of the USB interface 400.

The circuit for USB interface sharing in this exemplary embodiment may be arranged in a terminal. The terminal may be a computer, a TV, a set top box or other devices. The host device module 100 may be arranged to detect a USB signal and judge a type of a peripheral device currently accessing the USB interface 400. If the peripheral device is a USB slave device, for example, a USB flash disk, according to USB standards, one line of the two USB data lines of the peripheral device may have 1.5 kΩ pull-up resistance, and, after electrified, an electrical level of the data line having the pull-up resistance will be pulled up. The host device module 100 may detect an electrical level state in the USB data line of the peripheral device. If one of the two USB data lines of the peripheral device has higher electrical level, the type of the peripheral device may be USB slave device; otherwise, the type of the peripheral device is USB host device.

When the type of the peripheral device is USB host device, the host device module 100 may control the switch module 300 to switch on a path between the slave device module 200 and the USB interface 400, such that the terminal may realize the slave device function through the slave device module 200, and provide data to the peripheral device or allow the peripheral device to debug the USB interface of the terminal. When the type of the peripheral device is USB slave device, the host device module 100 may control the switch module 300 to switch on a path between the host device module 100 and the USB interface 400, such that the terminal may realize the host device function through the host device module 100 and acquire the data of the peripheral device.

This exemplary embodiment may enable the USB interface of the terminal to be shared simultaneously as a functional interface of a host device and a functional interface of a slave device, such that functions of the host device and functions of the slave device may be completed by one USB interface on the terminal, thereby providing convenience for data transmission between the terminal and the peripheral device. Moreover, it may not be needed to develop an interface inside a board separately, the internal board space may be saved and the miniaturization design of the terminal may be facilitated.

In an exemplary embodiment, in FIG. 1a, a second control output end of the host device module 100 may be connected to a second control input end of the switch module 300. A power input end of the switch module 300 may be connected to a power supply of a terminal. A power output end of the switch module 300 may be connected to a power input end of the USB interface.

When the USB interface 400 is not connected to a peripheral device, the host device module 100 may control the switch module 300 to be in a low-voltage supply mode. In the low-voltage supply mode, the switch module 300 may control the output voltage of the power supply of the terminal to be reduced and further supply the reduced voltage to the USB interface 400. When the type of the peripheral device is USB slave device, the load current may be increased when the peripheral USB slave device works, the larger the current, the larger the voltage reduction of the power supply. Under such a condition, if the switch module 300 is still in the low-voltage supply mode and supplies the reduced voltage to the USB interface 400, and when the load current is relatively large and the voltage reduction of the power supply of the terminal is over large, the voltage output by the USB interface 400 may not meet the USB specification requirements of the peripheral device. At this time, it may be needed to increase the output voltage of the USB interface 400, the switch module 300 may be controlled by the host device module 100 to switch to a high-voltage supply mode, and the switch module 300 may directly supply the power of the terminal to the USB interface 400. When the host device module 100 judges that the type of the peripheral device is USB host device, the terminal and the peripheral device may supply power to the USB interface 400 simultaneously. If the voltage supplied by the terminal is too high, the power supply of the peripheral device may be damaged. On the other hand, if the voltage of the peripheral device is too high, the power supply of the terminal may be damaged. Therefore, under this condition, the host device module 100 may control the switch module 300 to switch to be in the low-voltage supply mode. In the low-voltage supply mode, the switch module 300 may control the output voltage of the power supply of the terminal to be reduced and further supply the reduced voltage to the USB interface 400.

In view of a problem that the voltage is too high or too low when the terminal supplies power to the USB interface in the sharing of the USB interface, this exemplary embodiment provides a USB interface output voltage adjustable mode. When the peripheral device is a slave device, enough working voltage may be supplied; when the peripheral device is a host device, the risk that an opposite end device may be damaged if the terminal or the peripheral device supplies excessive high voltage to the opposite end device may be avoided, thus, higher safety may be realized.

Figure 1B:
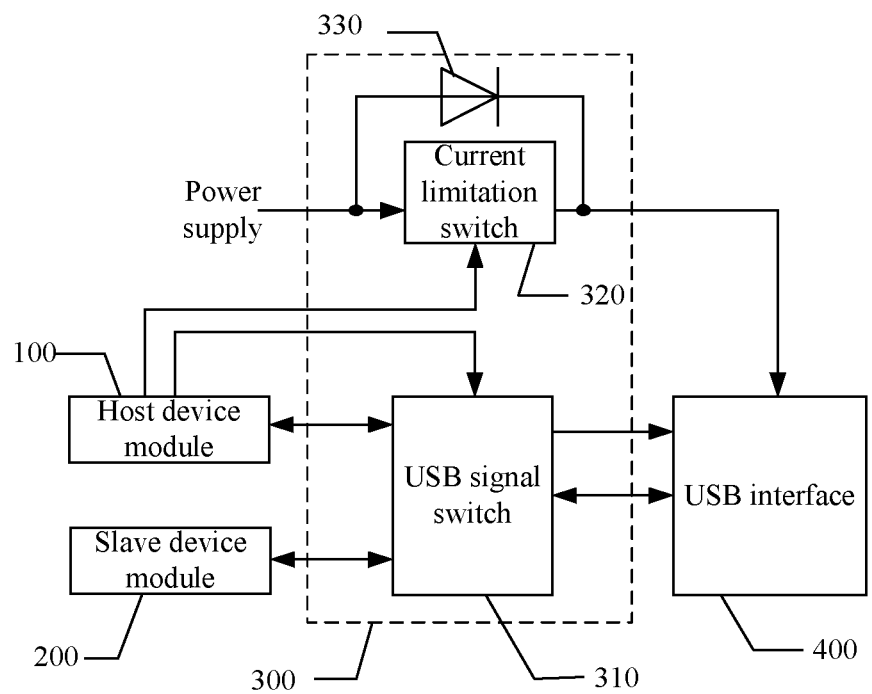
FIG. 1b is a structure diagram of another exemplary embodiment of the circuit for USB interface sharing of the disclosure.

FIG. 1b is a structure diagram of another exemplary embodiment of the circuit for USB interface sharing of the disclosure. As shown in FIG. 1b, in this exemplary embodiment, the switch module 300 may include a USB signal switch 310. A control input end of the USB signal switch 310 may serve as the first control input end of the switch module 300 and may be connected to the first control output end of the host device module 100. A first end of the USB signal switch 310 may serve as the first data end of the switch module 300 and may be connected to the data end of the host device module 100. A second end of the USB signal switch 310 may serve as the second data end of the switch module 300 and may be connected to the data end of the slave device module 200. A third end of the USB signal switch 310 may serve as the third data end of the switch module 300 and may be connected to the data end of the USB interface 400.

When the type of the peripheral device is USB host device, the host device module 100 may send a control signal to the USB signal switch 310, control the second end and third end of the USB signal switch 310 to be conducted and switch on a path between the slave device module 200 and the USB interface 400, such that the terminal may realize the slave device function through the slave device module 200, and provide data to the peripheral device or allow the peripheral device to debug the USB interface of the terminal. When the type of the peripheral device is USB slave device, the host device module 100 may send a control signal to the USB signal switch 310, control the first end and third end of the USB signal switch 310 to be conducted and switch on a path between the host device module 100 and the USB interface 400, such that the terminal may realize the host device function through the host device module 100 and acquire the data of the peripheral device.

In an exemplary embodiment, the switch module 300 may further include a current limitation switch 320 and a diode 330 in parallel connection with the current limitation switch 320. A control input end of the current limitation switch 320 may serve as the second control input end of the switch module 300 and may be connected to the second control output end of the host device module 100. A power input end of the current limitation switch 320 may serve as the power input end of the switch module 300 and may be connected to the power supply of the terminal. A power output end of the current limitation switch 320 may serve as the power output end of the switch module 300 and may be connected to the power input end of the USB interface 400. An anode of the diode 330 may be connected to the power input end of the current limitation switch 320 and a cathode of the diode 330 may be connected to the power output end of the current limitation switch 320.

When the USB interface 400 is not connected to a peripheral device, the host device module 100 may output a control signal to control the current limitation switch 320 to be opened, such that the power supply of the terminal may supply power to the USB interface 400 via the diode 330. Since the diode 330 may have a function of voltage reduction, the voltage output to the USB interface 400 by the power supply of the terminal via the diode 330 may be reduced. When the type of the peripheral device is USB slave device, it may be needed to increase the output voltage of the USB interface 400, the host device module 100 may output a control signal to the current limitation switch 320 to control the current limitation switch 320 to be closed, such that the power supply of the terminal may be directly supplied to the USB interface 400 so as to provide enough working voltage for the peripheral device. When the host device module 100 judges that the type of the peripheral device is USB host device, the terminal and the peripheral device may supply power to the USB interface 400 simultaneously. In order to avoid damaging the power supply of the terminal or the power supply of the peripheral device, the host device module 100 may output a control signal to the current limitation switch 320 to control the current limitation switch 320 to be opened, such that the power supply of the terminal may be output to the USB interface 400 after subjecting to the voltage reduction of the diode 330. Since the diode 330 may have a function of voltage reduction, the output voltage of the USB interface 400 may be smaller than the power supply voltage of the peripheral device, thus it may be guaranteed that the peripheral device is not damaged. In addition, the unidirectional conduction feature of the diode 330 and the reverse overvoltage protection of the current limitation switch 320 may prevent the output voltage of the peripheral device being too high, thereby avoiding damaging the internal power supply of the terminal.

Figure 2:
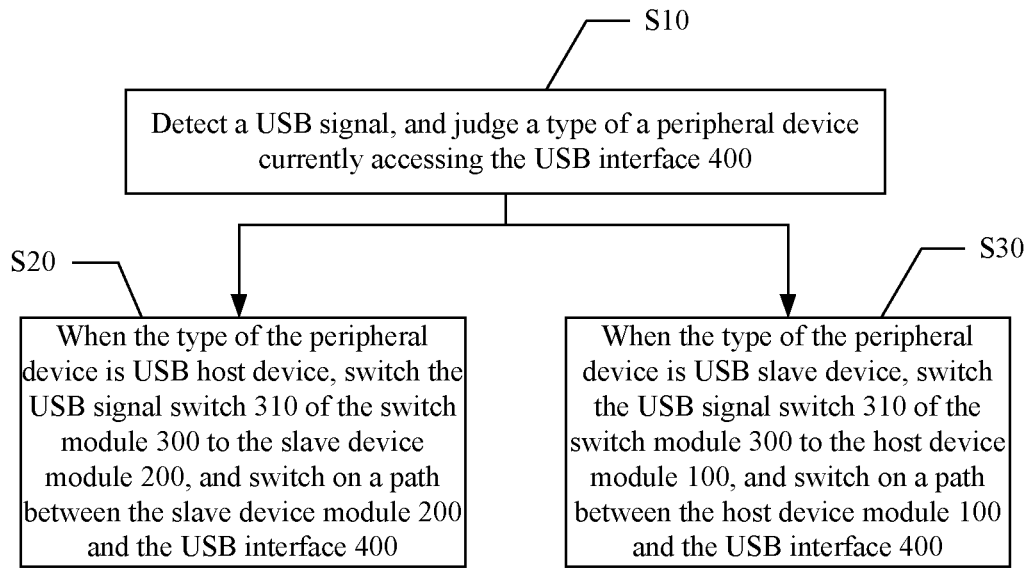
FIG. 2 is a flowchart of an exemplary embodiment of a method for USB interface sharing of the disclosure.

FIG. 2 is a flowchart of an exemplary embodiment of a method for USB interface sharing of the disclosure. As shown in FIG. 2, the method for USB interface 400 sharing provided in this exemplary embodiment may include the following acts.

At act S10, a USB signal may be detected, and a type of a peripheral device currently accessing the USB interface 400 may be judged.

This exemplary embodiment adopts the circuit for USB interface sharing described in the exemplary embodiments shown in FIG. 1a and FIG. 1b. The circuit for USB interface sharing may be arranged in a terminal, the terminal may be a computer, a TV, a set top box or other devices. The host device module 100 may be arranged to detect a USB signal and judge a type of a peripheral device currently accessing the USB interface 400. If the peripheral device is a USB slave device, for example, USB flash disk, according to USB standards, one line of the two USB data lines of the peripheral device may have 1.5 kΩ pull-up resistance, and, after electrified, an electrical level of the data line having the pull-up resistance will be pulled up. The host device module 100 may detect an electrical level state in the USB data line of the peripheral device. If one of the two USB data lines of the peripheral device has higher electrical level, the type of the peripheral device may be USB slave device; otherwise, the type of the peripheral device may be USB host device.

At act S20, when the type of the peripheral device is USB host device, the USB signal switch 310 of the switch module 300 may be switched to the slave device module 200, and a path between the slave device module 200 and the USB interface 400 may be switched on.

When the type of the peripheral device is USB host device, the host device module 100 may send a control signal to the USB signal switch 310 and control the USB signal switch 310 to switch on a path between the slave device module 200 and the USB interface 400, such that the terminal may realize the slave device function through the slave device module 200, and provide data to the peripheral device or allow the peripheral device to debug the USB interface of the terminal.

At act S30, when the type of the peripheral device is USB slave device, the USB signal switch 310 of the switch module 300 may be switched to the host device module 100, and a path between the host device module 100 and the USB interface 400 may be switched on.

When the type of the peripheral device is USB slave device, the host device module 100 may send a control signal to the USB signal switch 310 and control the USB signal switch 310 to switch on a path between the host device module 100 and the USB interface 400, such that the terminal may realize the host device function through the host device module 100 and acquire the data of the peripheral device.

This exemplary embodiment may enable the USB interface of the terminal to be shared simultaneously as a functional interface of a host device and a functional interface of a slave device, such that functions of the host device and functions of the slave device may be completed by one USB interface on the terminal, thereby providing convenience for data transmission between the terminal and the peripheral device. Moreover, it may not be needed to develop an interface inside a board separately, the internal board space may be saved and the miniaturization design of the terminal may be facilitated.

Figure 3:
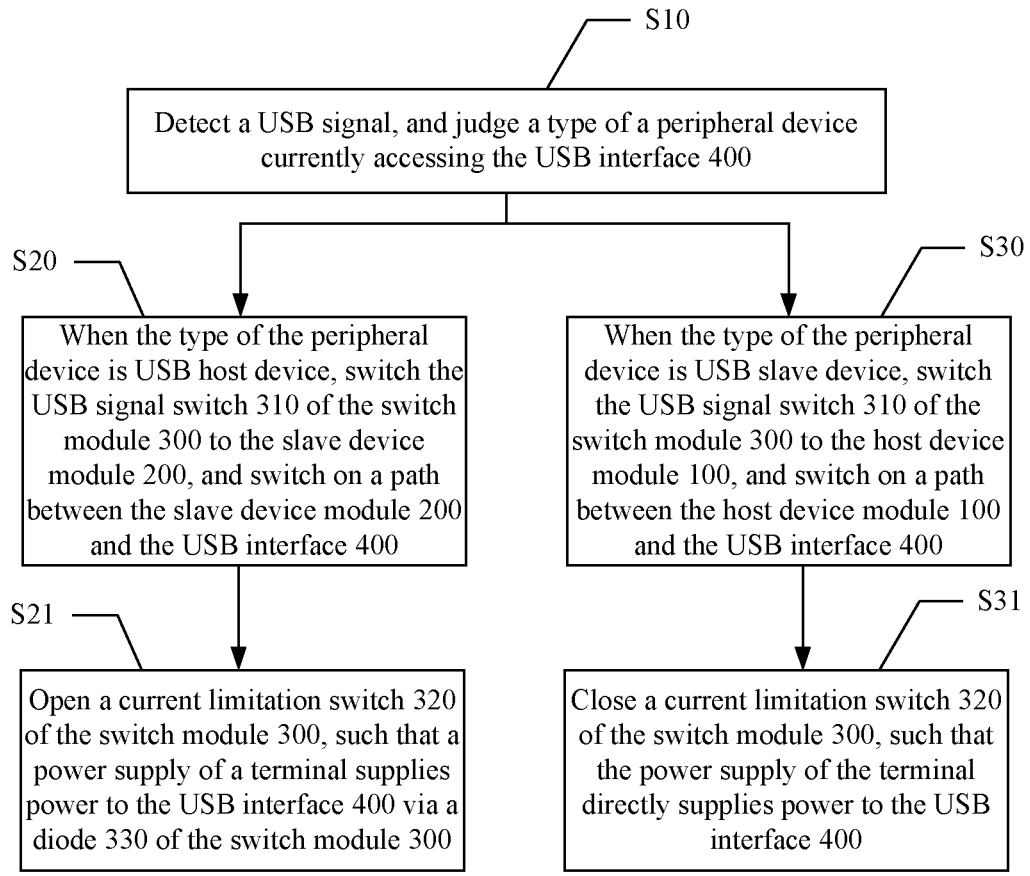
FIG. 3 is a flowchart of another exemplary embodiment of the method for USB interface sharing of the disclosure.

FIG. 3 is a flowchart of another exemplary embodiment of the method for USB interface sharing of the disclosure. As shown in FIG. 3, this exemplary embodiment may include all the acts in the exemplary embodiment shown in FIG. 2, and may further include the following act after the act S30.

At act S31, a current limitation switch 320 of the switch module 300 may be closed, such that a power supply of a terminal directly may supply power to the USB interface 400.

When the USB interface 400 is not connected to a peripheral device, the host device module 100 may control the switch module 300 to be in a low-voltage supply mode. In the low-voltage supply mode, the host device module 100 may output a control signal to control the current limitation switch 320 to be opened, such that the power supply of the terminal may supply power to the USB interface 400 via the diode 330. Since the diode 330 may have a function of voltage reduction, the voltage output to the USB interface 400 by the power supply of the terminal via the diode 330 may be reduced.

When the type of the peripheral device is USB slave device, the load current may be increased when the peripheral USB slave device works, the larger the current, the larger the voltage reduction of the power supply. Under such a condition, if the switch module 300 is still in the low-voltage supply mode and supplies the reduced voltage to the USB interface 400, and when the load current is relatively large and the voltage reduction of the power supply of the terminal is over large, the voltage output by the USB interface 400 may not meet the USB specification requirements of the peripheral device. At this time, it may be needed to increase the output voltage of the USB interface 400, and the switch module 300 may be controlled by the host device module 100 to switch to a high-voltage supply mode. In the high-voltage supply mode, the host device module 100 may output a control signal to the current limitation switch 320 and control the current limitation switch 320 to be closed, and the power supply of the terminal may be directly supplied to the USB interface 400 so as to provide sufficient working voltage for the peripheral device.

In an exemplary embodiment, after the act S20, the method may further include the following act.

At act S21, a current limitation switch 320 of the switch module 300 may be opened, such that the power supply of the terminal may supply power to the USB interface 400 via the diode 330 of the switch module 300.

When the host device module 100 determines that the type of the peripheral device is USB host device, the terminal and the peripheral device may supply power to the USB interface 400 simultaneously. If the voltage supplied by the terminal is too high, the power supply of the peripheral device may be damaged. On the other hand, if the voltage of the peripheral device is too high, the power supply of the terminal may be damaged. Therefore, under this condition, the host device module 100 may control the switch module 300 to switch to be in the low-voltage supply mode, and the host device module 100 may output a control signal to the current limitation switch 320 and control the current limitation switch 320 to be opened, such that the power supply of the terminal may be output to the USB interface 400 after subjecting to the voltage reduction of the diode 330. Since the diode 330 may have a function of voltage reduction, the output voltage of the USB interface 400 may be smaller than the power supply voltage of the peripheral device, thus it may be guaranteed that the peripheral device is not damaged. In addition, the unidirectional conduction feature of the diode 330 and the reverse overvoltage protection of the current limitation switch 320 may prevent the output voltage of the peripheral device being too high, thereby avoiding damaging the internal power supply of the terminal.

In view of a problem that the voltage is too high or too low when the terminal supplies power to the USB interface in the sharing of the USB interface, this exemplary embodiment provides a USB interface output voltage adjustable mode. When the peripheral device is a slave device, enough working voltage may be supplied; when the peripheral device is a host device, the risk that an opposite end device may be damaged if the terminal or the peripheral device supplies excessive high voltage to the opposite end device may be avoided, thus, higher safety may be realized.

Figure 4:
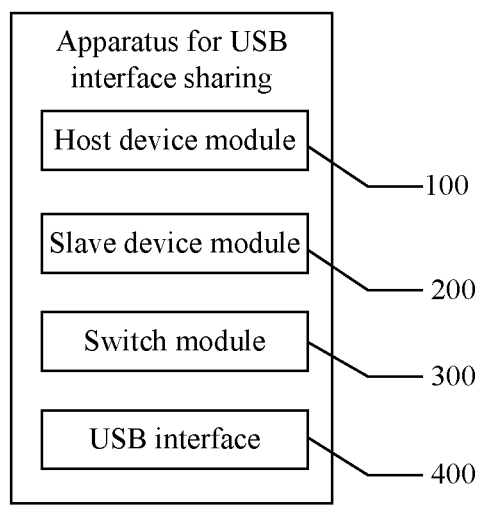
FIG. 4 is a module diagram of an exemplary embodiment of an apparatus for USB interface sharing of the disclosure.

FIG. 4 is a module diagram of an exemplary embodiment of an apparatus for USB interface sharing of the disclosure. As shown in FIG. 4, the apparatus for USB interface sharing provided by this exemplary embodiment may include a host device module 100, a slave device module 200, a switch module 300 and a USB interface 400. The host device module 100 may detect a USB signal and judge a type of a peripheral device currently accessing the USB interface 400. When the type of the peripheral device is USB host device, the host device module 100 may control the switch module 300 to switch on a path between the slave device module 200 and the USB interface 400. When the type of the peripheral device is USB slave device, the host device module 100 may control the switch module 300 to switch on a path between the host device module 100 and the USB interface 400.

This exemplary embodiment adopts the circuit for USB interface sharing described in the exemplary embodiments shown in FIG. 1a and/or FIG. 1b. The circuit for USB interface sharing may be arranged in a terminal. The terminal may be a computer, a TV, a set top box or other devices. The host device module 100 may be arranged to detect a USB signal and judge a type of a peripheral device currently accessing the USB interface 400. If the peripheral device is a USB slave device, for example, USB flash disk, according to USB standards, one line of the two USB data lines of the peripheral device may have 1.5 kΩ pull-up resistance, and, after electrified, an electrical level of the data line having the pull-up resistance will be pulled up. The host device module 100 may detect an electrical level state in the USB data line of the peripheral device. If one of the two USB data lines of the peripheral device has higher electrical level, the type of the peripheral device may be USB slave device; otherwise, the type of the peripheral device may be USB host device.

When the type of the peripheral device is USB host device, the host device module 100 may control the switch module 300 to switch on a path between the slave device module 200 and the USB interface 400, such that the terminal may realize the slave device function through the slave device module 200, and provide data to the peripheral device or allow the peripheral device to debug the USB interface of the terminal. When the type of the peripheral device is USB slave device, the host device module 100 may control the switch module 300 to switch on a path between the host device module 100 and the USB interface 400, such that the terminal may realize the host device function through the host device module 100 and acquire the data of the peripheral device.

This exemplary embodiment may enable the USB interface of a terminal to be shared simultaneously as a functional interface of a host device and a functional interface of a slave device, such that functions of the host device and functions of the slave device may be completed by one USB interface on the terminal, thereby providing convenience for data transmission between the terminal and the peripheral device. Moreover, it may not be needed to develop an interface inside a board separately, the internal board space may be saved and the miniaturization design of the terminal may be facilitated.

In an exemplary embodiment, the switch module 300 may include a USB signal switch. When the type of the peripheral device is USB host device, the host device module 100 may control the USB signal switch 310 of the switch module 300 to switch to the slave device module 200. When the type of the peripheral device is USB slave device, the host device module 100 may control the USB signal switch 310 of the switch module 300 to switch to the host device module 100.

In this exemplary embodiment, when the type of the peripheral device is USB host device, the host device module 100 may send a control signal to the USB signal switch 310, control the second end and third end of the USB signal switch 310 to be conducted and switch on the path between the slave device module 200 and the USB interface 400, such that the terminal may realize the slave device function through the slave device module 200 and provide data to the peripheral device or allow the peripheral device to debug the USB interface of the terminal. When the type of the peripheral device is USB slave device, the host device module 100 may send a control signal to the USB signal switch 310, control the first end and third end of the USB signal switch 310 to be conducted and switch on the path between the host device module 100 and the USB interface 400, such that the terminal may realize the host device function through the host device module 100 and acquire the data of the peripheral device.

In an exemplary embodiment, the switch module 300 may further include a current limitation switch 320 and a diode 330. When the type of the peripheral device is USB slave device, the host device module 100 may control the current limitation switch 320 of the switch module 300 to be closed, such that a power supply of a terminal directly may supply power to the USB interface 400. When the type of the peripheral device is USB host device, the host device module 100 may control the current limitation switch 320 of the switch module 300 to be opened, such that the power supply of the terminal may supply power to the USB interface 400 via the diode 330.

In this exemplary embodiment, when the USB interface 400 is not connected to a peripheral device, the host device module 100 may control the switch module 300 to be in a low-voltage supply mode. In the low-voltage supply mode, the host device module 100 may output a control signal to control the current limitation switch 320 to be opened, such that the power supply of the terminal may supply power to the USB interface 400 via the diode 330. Since the diode 330 may have a function of voltage reduction, the voltage output to the USB interface 400 by the power supply of the terminal via the diode 330 may be reduced.

When the type of the peripheral device is USB slave device, the load current may be increased when the peripheral USB slave device works, the larger the current, the larger the voltage reduction of the power supply. Under such a condition, if the switch module 300 is still in the low-voltage supply mode and supplies the reduced voltage to the USB interface 400, and when the load current is relatively large and the voltage reduction of the power supply of the terminal is over large, the voltage output by the USB interface 400 may not meet the USB specification requirements of the peripheral device. At this time, it may be needed to increase the output voltage of the USB interface 400, the switch module 300 may be controlled by the host device module 100 to switch to a high-voltage supply mode, the host device module 100 may output a control signal to the current limitation switch 320 to control the current limitation switch 320 to be closed, such that the power supply of the terminal may be directly supplied to the USB interface 400 so as to provide enough working voltage for the peripheral device.

When the host device module 100 judges that the type of the peripheral device is USB host device, the terminal and the peripheral device may supply power to the USB interface 400 simultaneously. If the voltage supplied by the terminal is too high, the power supply of the peripheral device may be damaged. On the other hand, if the voltage of the peripheral device is too high, the power supply of the terminal may be damaged. Therefore, under this condition, the host device module 100 may control the switch module 300 to switch to be in the low-voltage supply mode, and the host device module 100 may output a control signal to the current limitation switch 320 to control the current limitation switch 320 to be opened, such that the power supply of the terminal may be output to the USB interface 400 after subjecting to the voltage reduction of the diode 330. Since the diode 330 may have a function of voltage reduction, the output voltage of the USB interface 400 may be smaller than the power supply voltage of the peripheral device, thus it may be guaranteed that the peripheral device is not damaged. In addition, the unidirectional conduction feature of the diode 330 and the reverse overvoltage protection of the current limitation switch 320 may prevent the output voltage of the peripheral device being too high, thereby avoiding damaging the internal power supply of the terminal.

In view of a problem that the voltage is too high or too low when the terminal supplies power to the USB interface in the sharing of the USB interface, this exemplary embodiment provides a USB interface output voltage adjustable mode. When the peripheral device is a slave device, enough working voltage may be supplied; when the peripheral device is a host device, the risk that an opposite end device may be damaged if the terminal or the peripheral device supplies excessive high voltage to the opposite end device may be avoided, thus, higher safety may be realized.

Industrial applicability: from the above description, it may be known that the solution in some embodiments of the present disclosure may enable the USB interface of the terminal to be shared simultaneously as a functional interface of a host device and a functional interface of a slave device, such that functions of the host device and functions of the slave device may be completed by one USB interface on the terminal, thereby providing convenience for data transmission between the terminal and the peripheral device. Moreover, it may not be needed to develop an interface inside a board separately, the internal board space may be saved and the miniaturization design of the terminal may be facilitated.

The above are exemplary embodiments of the present disclosure merely and are not intended to limit the patent scope of the present disclosure. Any equivalent structures or equivalent process transformation made according to the description and the accompanying drawings of the present disclosure, or any equivalent structures or equivalent flow modifications applied in other relevant technical fields directly or indirectly are intended to be included in the patent protection scope defined by the appended claims of the present disclosure.

What is claimed is:

1. A circuit for Universal Serial Bus (USB) interface sharing, comprising: a host device module, a slave device module, a switch module and a USB interface, wherein a detection end of the host device module is connected to a signal detection end of the USB interface, a first control output end of the host device module is connected to a first control input end of the switch module, a data end of the host device module is connected to a first data end of the switch module, a data end of the slave device module is connected to a second data end of the switch module, and a third data end of the switch module is connected to a data end of the USB interface;

wherein the switch module further comprises a current limitation switch and a diode in parallel connection with the current limitation switch, a control input end of the current limitation switch serves as the second control input end of the switch module and is connected to the second control output end of the host device module, a power input end of the current limitation switch serves as the power input end of the switch module and is connected to the power supply of the terminal, a power output end of the current limitation switch serves as the power output end of the switch module and is connected to the power input end of the USB interface, an anode of the diode is connected to the power input end of the current limitation switch and a cathode of the diode is connected to the power output end of the current limitation switch;

when the type of the peripheral device is USB slave device, the host device module controls the current limitation switch of the switch module to be closed, such that a power supply of a terminal directly supplies power to the USB interface; and, when the type of the peripheral device is USB host device, the host device module controls the current limitation switch of the switch module to be opened, such that the power supply of the terminal supplies power to the USB interface via the diode.

2. The circuit for USB interface sharing as claimed in claim 1, wherein the switch module comprises a USB signal switch, a control input end of the USB signal switch serves as the first control input end of the switch module and is connected to the first control output end of the host device module, a first end of the USB signal switch serves as the first data end of the switch module and is connected to the data end of the host device module, a second end of the USB signal switch serves as the second data end of the switch module and is connected to the data end of the slave device module, and a third end of the USB signal switch serves as the third data end of the switch module and is connected to the data end of the USB interface.

3. A method for Universal Serial Bus (USB) interface sharing implemented adopting the circuit for USB interface sharing as claimed in claim 1, comprising:

detecting a USB signal, and judging a type of the peripheral device currently accessing the USB interface;

when the type of the peripheral device is USB host device, switching the USB signal switch of the switch module to the slave device module, and switching on a path between the slave device module and the USB interface; and when the type of the peripheral device is USB slave device, switching the USB signal switch of the switch module to the host device module, and switching on a path between the host device module and the USB interface.

4. The method for USB interface sharing as claimed in claim 3, wherein when the type of the peripheral device is USB host device, after switching the USB signal switch of the switch module to the slave device module and switching on the path between the slave device module and the USB interface, the method further comprises:

opening the current limitation switch of the switch module, such that the power supply of the terminal supplies power to the USB interface via the diode of the switch module.

5. The method for USB interface sharing as claimed in claim 3, wherein when the type of the peripheral device is USB slave device, after switching the USB signal switch of the switch module to the host device module and switching on the path between the host device module and the USB interface, the method further comprises:

closing the current limitation switch of the switch module, such that the power supply of the terminal directly supplies power to the USB interface.

6. An apparatus for Universal Serial Bus (USB) interface sharing implemented adopting the circuit for USB interface sharing as claimed in claim 1, comprising a host device module, a slave device module, a switch module and a USB interface, wherein the host device module detects a USB signal and judges a type of the peripheral device currently accessing the USB interface; when the type of the peripheral device is USB host device, the host device module controls the switch module to switch on a path between the slave device module and the USB interface; and, when the type of the peripheral device is USB slave device, the host device module controls the switch module to switch on a path between the host device module and the USB interface.

7. The apparatus for USB interface sharing as claimed in claim 6, wherein the switch module comprises a USB signal switch; when the type of the peripheral device is USB host device, the host device module controls the USB signal switch of the switch module to switch to the slave device module; and, when the type of the peripheral device is USB slave device, the host device module controls the USB signal switch of the switch module to switch to the host device module.

8. A method for Universal Serial Bus (USB) interface sharing implemented adopting the circuit for USB interface sharing as claimed in claim 2, comprising:

detecting a USB signal, and judging a type of the peripheral device currently accessing the USB interface;

when the type of the peripheral device is USB host device, switching the USB signal switch of the switch module to the slave device module, and switching on a path between the slave device module and the USB interface; and when the type of the peripheral device is USB slave device, switching the USB signal switch of the switch module to the host device module, and switching on a path between the host device module and the USB interface.

9. The method for USB interface sharing as claimed in claim 4, wherein when the type of the peripheral device is USB slave device, after switching the USB signal switch of the switch module to the host device module and switching on the path between the host device module and the USB interface, the method further comprises:

closing the current limitation switch of the switch module, such that the power supply of the terminal directly supplies power to the USB interface.

10. An apparatus for Universal Serial Bus (USB) interface sharing implemented adopting the circuit for USB interface sharing as claimed in claim 2, comprising a host device module, a slave device module, a switch module and a USB interface, wherein the host device module detects a USB signal and judges a type of a peripheral device currently accessing the USB interface; when the type of the peripheral device is USB host device, the host device module controls the switch module to switch on a path between the slave device module and the USB interface; and, when the type of the peripheral device is USB slave device, the host device module controls the switch module to switch on a path between the host device module and the USB interface.

* * * * *